US010891358B2

(12) United States Patent
Truschi et al.

(10) Patent No.: US 10,891,358 B2
(45) Date of Patent: Jan. 12, 2021

(54) INDUSTRIAL CONTROL SYSTEM MANAGEMENT (71) Applicant: Nuovo Pignone Tecnologie SRL, Florence (IT)

(72) Inventors: Stefano Truschi, Florence (IT); Virginia Castelli, Florence (IT); Carlo Snickars, Florence (IT)

(73) Assignee: NUOVO PIGNONE TECNOLOGIE SRL, Florence (IT)

( * ) Notice: Subject to any disclaimer, the term of this patent is extended or adjusted under 35 U.S.C. 154(b) by 178 days.

(21) Appl. No.: 16/069,064

(22) PCT Filed: Jan. 13, 2017

(86) PCT No.: PCT/EP2017/050719
§ 371 (c)(1),
(2) Date: Jul. 10, 2018

(87) PCT Pub. No.: WO2017/121878
PCT Pub. Date: Jul. 20, 2017

(65) Prior Publication Data
US 2019/0065708 A1 Feb. 28, 2019

(30) Foreign Application Priority Data
Jan. 15, 2016 (IT) .................. 102016000003460

(51) Int. Cl.
G06F 21/12 (2013.01)
G05B 19/042 (2006.01)

(52) U.S. Cl.
CPC ....... G06F 21/121 (2013.01); G05B 19/0426 (2013.01); G05B 2219/24155 (2013.01);
(Continued)

(58) Field of Classification Search
CPC ...... G05B 19/0426; G05B 2219/24155; G05B 2219/24161; G05B 2219/24165;
(Continued)

(56) References Cited

U.S. PATENT DOCUMENTS 7,509,687 B2 * 3/2009 Ofek .................. G06F 21/14
709/227
7,962,416 B1 * 6/2011 Durbin .................. G06F 21/10
705/55

(Continued)

FOREIGN PATENT DOCUMENTS

EP 2 779 009 A2 9/2014

OTHER PUBLICATIONS

Armin Wasicek, "Copy Protection for Automotive Electronic Control Units using Authenticity Heartbeat Signals", 2012 IEEE, pp. 821-826 (Year: 2012).*

(Continued)

Primary Examiner — Khalil Naghdali
(74) Attorney, Agent, or Firm — Baker Hughes Patent Org.

(57) ABSTRACT

Methods, systems, and computer-readable media for industrial control software execution management. For example, there is provided a method for enabling a software module included in a plurality of software modules of an application package installed on a computing device configured to control a turbomachine of an industrial plant. The method can include receiving, by a processor of the computing device, a request for executing the software module. The method can include generating and sending an activation request to a remote server. The method can include generating, by the remote server, an activation code if a verification protocol is successfully completed. The method can include forwarding the activation code to the computing (Continued)

device. The method can include activating the software module when the activation code is received by the processor.

17 Claims, 5 Drawing Sheets

(52) U.S. Cl.
CPC ............ *G05B 2219/24161* (2013.01); *G05B 2219/24165* (2013.01); *G05B 2219/24167* (2013.01); *G05B 2219/36542* (2013.01); *G06F 2221/2137* (2013.01)

(58) Field of Classification Search
CPC .......... G05B 2219/24167; G05B 2219/36542; G06F 21/121; G06F 2221/2137
USPC .......................................................... 726/26
See application file for complete search history.

(56) References Cited

U.S. PATENT DOCUMENTS

| | | | |
|---|---|---|---|
| 9,129,118 B1* | 9/2015 | Johansson | G06F 21/6227 |
| 2003/0126456 A1 | 7/2003 | Birzer et al. | |
| 2009/0077383 A1* | 3/2009 | de Monseignat | H04L 9/3242 713/175 |
| 2011/0162091 A1 | 6/2011 | Huang | |
| 2012/0110342 A1 | 5/2012 | Agrawal et al. | |
| 2012/0148382 A1* | 6/2012 | Kruger | G05B 23/0251 415/1 |
| 2013/0110726 A1* | 5/2013 | Pereira | G06F 21/105 705/59 |
| 2015/0074815 A1* | 3/2015 | Huscroft | G06F 21/105 726/26 |
| 2016/0025028 A1* | 1/2016 | Vaughan | F02D 41/1405 701/105 |

OTHER PUBLICATIONS

Italian Search Report and Written Opinion issued in connection with corresponding IT Application No. 102016000003460 dated Oct. 11, 2016.
International Search Report and Written Opinion issued in connection with corresponding PCT Application No. PCT/EP2017/050719 dated May 16, 2017.
International Preliminary Report on Patentability issued in connection with corresponding PCT Application No. PCT/EP2017/050719 dated Jul. 17, 2018.

* cited by examiner

INDUSTRIAL CONTROL SYSTEM MANAGEMENT

TECHNICAL FIELD

The present disclosure generally relates to industrial control systems. More particularly, the present disclosure relates to industrial control system management.

BACKGROUND OF THE INVENTION

In industrial control systems, software upgrades or installations must follow a cycle that includes receiving desired specifications, generating a quotation, downloading the software or the upgrades at the site, and installing the software or upgrades at the site by a qualified technician. This cycle adversely affects productivity, as machines must be shut down to accommodate the new installation or upgrades, which leads to prolonged down times as well as increased costs. Accordingly, there is a need for simpler and more efficient control software management in an industrial setting.

SUMMARY OF INVENTION

The embodiments featured herein help solve or mitigate the above-noted issues as well as other deficiencies known in the art. Specifically, embodiments of the invention help minimize installation times, thus providing increased customer satisfaction. Furthermore, embodiments of the invention allow applications to be activated for a trial period, thus allowing the customer to evaluate a product. The embodiments also allow subscription models to be implemented, thereby providing increased value to the software manufacturer as well as to the industrial plant operator. Furthermore, embodiments of the invention prevent or minimize subsequent installations as all software modules in a given application package are provided and installed at once; a customer may simply activate a previously inactive software module simply by acquiring a key from the software vendor.

In today's industrial control systems, control applications (or software) are used to control one or more machines at an industrial plant. Embodiments of the invention will allow the seamless integration of a plurality software modules into a compact control application. Each of the software modules is capable of controlling one or more functions of an industrial machine. Furthermore, in embodiments of the invention, a code can be associated with each of the software modules, and the code may be used by a management system to activate or deactivate a software module, depending on the user's subscription policies. Specifically, for a control application, the code can be sent by a remote server (of the vendor) directly to the machine or the code is inserted in the control application's human machine interface (HMI). Once the control application is deployed, a particular software module can be enabled or disabled online, thus preventing the time-consuming and costly deployment and/or upgrade cycles described above.

In one exemplary embodiment, there is provided a method for enabling a software module included in a plurality of software modules of an application package installed on a computing device configured to control a turbomachine of an industrial plant. The method can comprise receiving, by a processor of the computing device, a request for executing the software module. The method can comprise generating and sending an activation request to a remote server. The method can comprise generating, by the remote server, an activation code if a verification protocol is successfully completed. The method can comprise forwarding the activation code to the computing device. The method can comprise activating the software module when the activation code is received by the processor.

In another exemplary embodiment, there is provided a system for enabling a software module included in a plurality of software modules of an application package. The system comprises at least one computing device wherein the application package is installed and a remote server connected via network to the computing device. The computing device can be configured to control a turbomachine of an industrial plant and includes a processor and a memory. The memory stores instructions that, when executed by the processor, cause the processor to perform certain operations. The operations can comprise receiving a request for executing the software module, generating and sending an activation request to a remote server, receiving an activation code from the remote server, activating the software module when the activation code is received. The remote server includes a further processor and a further memory. The memory stores further instructions that, when executed by the processor, cause the processor to perform certain operations. The operations can comprise receiving an activation request from a computing device, generating an activation code if a verification protocol is successfully completed, and forwarding the activation code to the computing device.

In yet another exemplary embodiment, there is provided a non-transitory computer-readable storage medium of a computing device configured to control a turbomachine. The non-transitory computer readable storage medium can include instructions. These instructions when executed by a processor can cause the processor to perform operations. The operations can comprise receiving a request for executing the software module, generating and sending an activation request to a remote server, receiving an activation code from the remote server, activating the software module when the activation code is received.

Additional features, modes of operations, advantages, and other aspects of various embodiments are described below with reference to the accompanying drawings. It is noted that the present disclosure is not limited to the specific embodiments described herein. These embodiments are presented for illustrative purposes only. Additional embodiments, or modifications of the embodiments disclosed, will be readily apparent to persons skilled in the relevant art(s) based on the teachings provided.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

DETAILED DESCRIPTION

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility.

Figure 1:
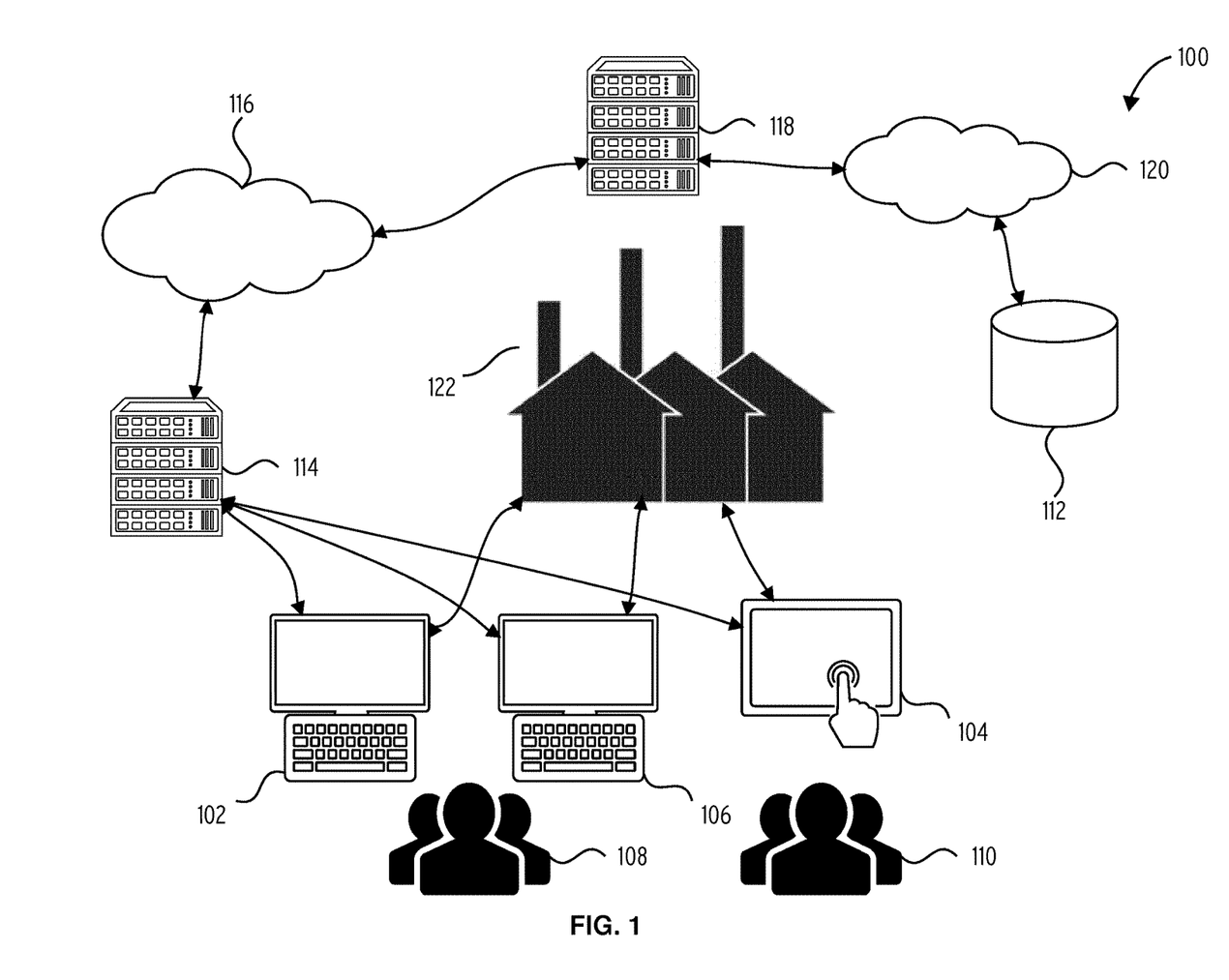
FIG. 1 is an illustration of a system, according to an embodiment.

FIG. 1 is an illustration of a system 100, according to an embodiment. System 100 can include a plurality of devices, processors, controllers, sensors, and machines, all of which cooperatively function according to exemplary methods that will be described further below.

System 100 can include a plurality of control devices, such as computer 102, computer 106, and computing device 104. Computing device 104 can be either a mobile device or an embedded computer system included in an industrial machine. Computers 102 and 106, for example, can be workstations.

Computers 102 and 106 and/or computing device 104 are operated by technicians 108 and 110 to control and monitor machines, equipment, and/or a variety of computer systems located at industrial plant 122. For example, industrial plant 122 can be an oil/gas power plant housing a plurality of turbine trains and their associated control devices.

Controlling a device of industrial plant 122 can be achieved using specialized control software that directs the device to perform one or more functions. These functions can be performed either sequentially or in parallel, and can be scheduled for execution or performed as soon as they are requested by one of technicians 108 or 110.

By example, and not by limitation, one function can include the tuning of combustion mapping for achieving low emissions in a turbomachine train. Another function can be the tuning of efficiency and/or power of the turbomachine train. One of skill in the art will readily recognize the equipment necessary to achieve these functions at industrial plant 122. In general, however, any controllable equipment and its associated functions are contemplated in the context of embodiments of this invention.

The specialized software executed by computers 102 or 106, or computing device 104, to control equipment at industrial plant 122 can vary based on the function and/or the equipment controlled. By example, and not by limitation, such software can be High Load Premix Transfer (HLPT), Dry Low Emission Tumas (DLET), and Predictive Emissions Monitoring System (PEMS). The HLPT software allows the control of the passage of premix in a turbomachine without decreasing its load. The DLET software allows the control of efficiency in the turbomachine. The PEMS software provides predictions of NOx, CO2, and O2 emissions based on measured data reported by sensors located in the turbomachine.

In general, a plurality of software modules is needed to operate industrial plant 122. Each software module can be dedicated to one or more specific functions and/or to one or more specific equipment. In one embodiment, the plurality of software modules can be bundled into one application package.

The application package can be installed at a server 114, which may be co-located with computer 102, computer 106, computing device 104, and industrial plant 122. Alternatively, server 114 can be located at a remote location while still being accessible to computer 102, computer 106, and computing device 104 via a network (not shown).

Furthermore, server 114 can be communicatively coupled to a remote server 118 via network 116. Remote server 118 can be remotely located from industrial plant 122, and can be the server of a vendor that provides the application package. Remote server 118 can be at the edge of a network 120, and can be communicatively coupled to a database 112. Network 120 can be a local network internal to the vendor. Database 112 can include information relating to customers, such as data relating to industrial plant 122 and the application package that is installed on one or more machines, servers, associated with industrial plant 122.

In one embodiment, the one application package includes at least one software module that is in an active state and at least one software module that is in an inactive state. In other embodiments, all the software modules in the application package can be active or inactive. As shall be described below, the state of a software module can be changed from inactive to active or vice versa.

An active state of a software module can be considered herein as any state in which computers 106 or 102, or computing device 104 can execute the specific software module to cause equipment to perform a desired function. Conversely, an inactive state is one in which computers 106 or 102, or computing device 104 cannot execute the software module. While software modules can be active or inactive, in the embodiments of the invention, all the software modules are installed on server 114.

Moreover, although in the above example the application package is installed on server 114, in other embodiments, it can be installed on any one of computer 106, computer 102, and/or computing device 104. In such embodiments, server 114 may merely serve as a license management server or the like.

Figure 2:
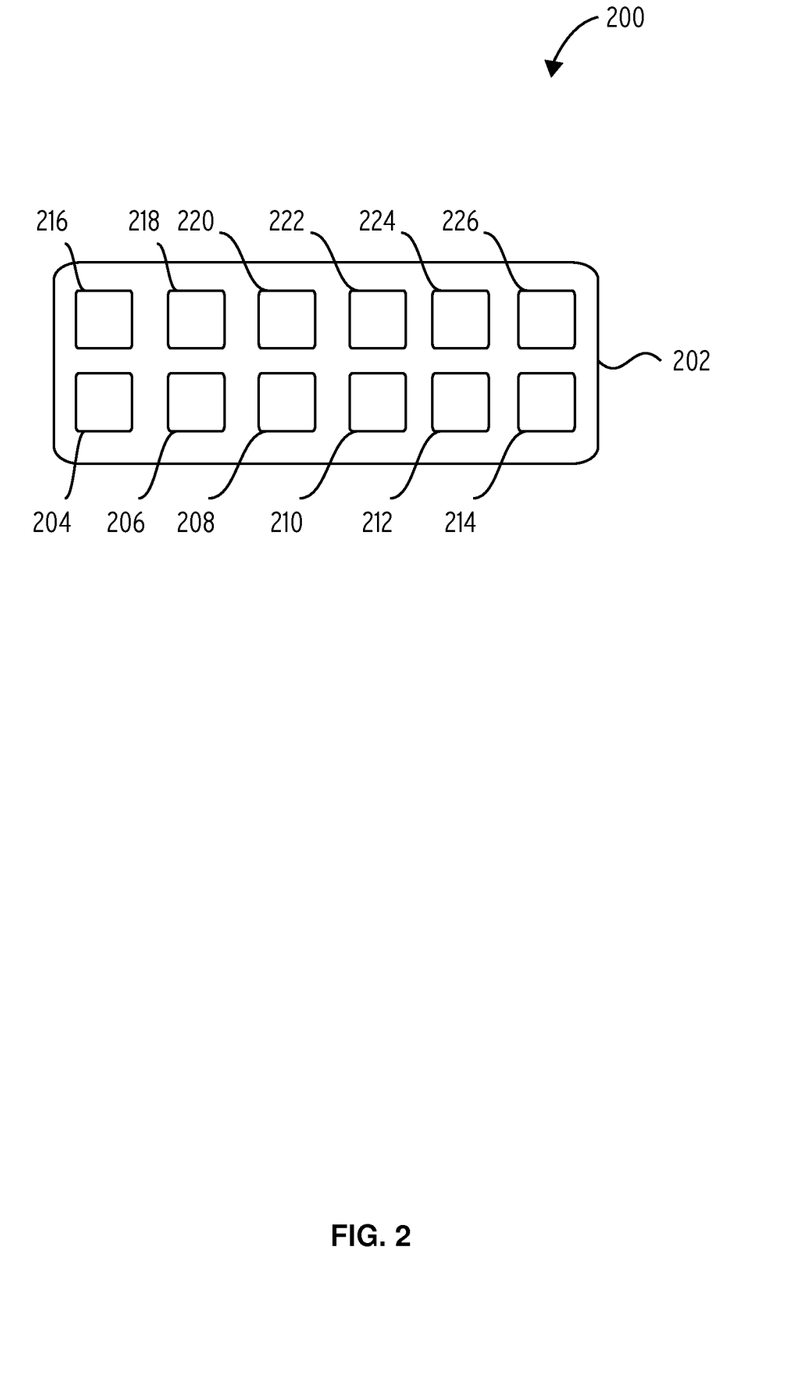
FIG. 2 is an illustration of an application package, according to an embodiment.

FIG. 2 is an illustration of an application package 200, according to the embodiments. Application package 200 can include a plurality of software modules installed, for example, in a memory 202 of a computer or processor (not shown). For example, memory 202 can be a memory section in server 114. Any one of software modules 204, 206, 208, 210, 210, 212, 214, 216, 218, 220, 222, 224, and 226 can be either active or inactive.

Figure 3:
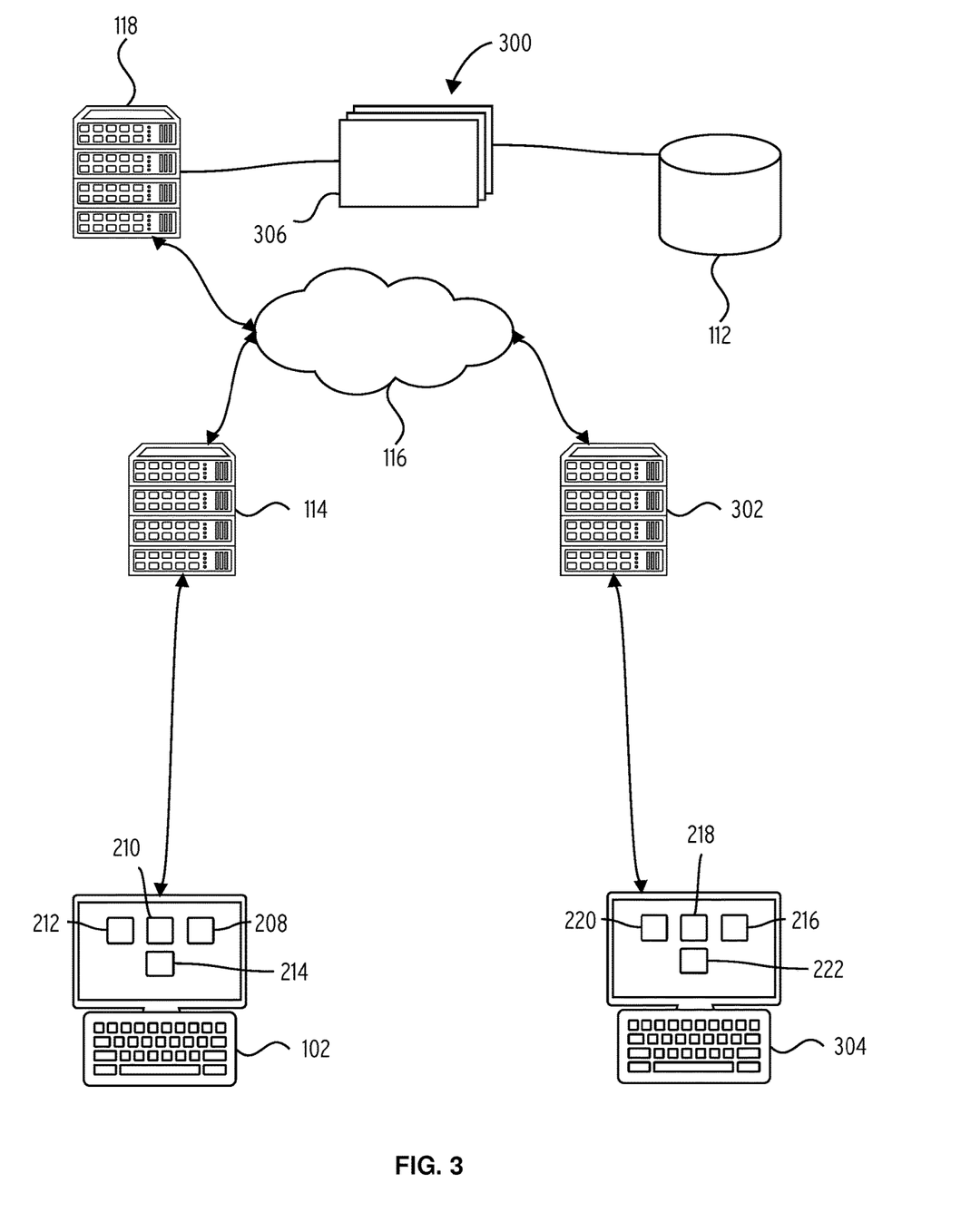
FIG. 3 is an illustration of a scenario in which subsets of software modules of an application package are activated, according to an embodiment.

FIG. 3 is an illustration of a scenario 300 in which a subset of software modules of application package 200 are active. Application package 200 is installed on both server 114 and server 302. As noted in FIG. 1, server 114 is associated with industrial plant 122. In FIG. 3, server 302 and computer 304 can be associated with another industrial plant (not shown).

In scenario 300, computer 102 can only execute software modules 208, 210, 212, and 214, and cannot execute the remaining software modules of application package 200 (see FIG. 2). Similarly, computer 304 can only execute software modules 216, 218, 220, and 222, and it cannot execute the remaining software modules of application package 200. The determination of which software modules that computer 102 or computer 304 can execute is described below, according to exemplary embodiments of the invention.

A technician using computer 102 may connect to server 114 and request the execution of software module 208, for example. This can be accomplished via a Human Machine Interface (HMI) installed on computer 102. Upon receiving the request, the server 114 forwards the request to remote server 118 of the vendor, an authentication and/or verification protocol, in the form of a computer program, is executed by a processor of remote server 118 to verify whether computer 102 is authorized to execute module 208.

The verification protocol can include checking whether industrial plant 122 has a license for executing software module 208. This information can reside in database 112, in relational tables 306, which include information about which plants can access which software modules of application package 200.

In one embodiment, in response to receiving a request for utilizing an inactive software module, an activation code can be generated by remote server 118 by a dedicated technique. In this case, the server 114 can generate and send an activation request to the remote server 118. Optionally, the request is forwarded via a network 116 and, in an embodiment, can be contained in a message. Said message can be of different types and formats, by example, and not by limitation, the message can be an SMS message sent by GSM router connected to the local server 114. The request can contain an identifier value (e.g. contract number, server identification number, phone number, e-mail address, etc.) specifying the server 114 or the computers 102, 106 operated by the user 108. Additionally, the remote server 118 can receive through the request a notification indicating the status and the identity software module that is to be activated on the server 114. In the remote server 118, the activation code can be generated by a dedicated technique and if a verification protocol is successfully completed, thus whether the execution of verification protocol issues a positive outcome. The generated activation code can then be hashed, encrypted, and transmitted by remote server 118, over network 116, to server 114. Optionally, the activation code can be contained in a message and said message can be of different types and format. By example, and not by limitation, the message can be an SMS message and the remote server 118 can comprise a GSM router. Remote server 118 can then forward the generated activation code to a processor of server 114, which includes the same dedicated technique used by remote server 118. Once the activation code is received by the processor of the server 114, the software module 208 is activated automatically, thus without any human intervention.

The dedicated technique is, generally speaking, based on a comparison for data change detection. By example, and not by limitation, the dedicated technique can be executed as follows. Remote server 118 can calculate a short, fixed-length sequence, known as a check value, for each block of an arbitrary code word which will be included in data that are to be sent to server 114. Remote server 118 can then append the check value to the data code word, thus forming the activation code.

When the activation code is received by server 114, its processor either compares the activation code's check value with one freshly calculated from the received activation code word, or equivalently, it can perform a check on the whole activation code and compare the resulting check value with an expected residue constant. The expected residue constant may be part of a second code that is pre-associated with the software module upon installation. If the check values do not match, then the activation code contains a data error. Server 114 may take corrective action, such as rereading the activation code or requesting that it be sent again. If the check values match, then the software module is activated and ready for use.

Alternatively, the activation is a coded switch-on instruction which the processor of the server 114 can decode and use for enabling the software module.

In one exemplary scenario, remote server 118 may fetch subscription data from database 112 upon receiving a request from server 114 to use a particular software module for performing the verification protocol. The subscription data may include information regarding whether machines associated with server 114 are allowed to use the requested software module. If that is the case, remote server 118 can send a correct activation code to server 114, with which no error will be detected in the activation code, and which will in turn activate the software module. Otherwise, remote server 118 can send a generic code that will purposely trigger an error, thus preventing the activation of the software module for which permission was requested.

In another embodiment, a specific code can be associated with software module 208. This code may have been associated with software module 208 upon the installation of application package 200. Generally speaking, each software module of application package 200 can have a specific code associated with it.

When software module 208 is selected for execution on computer 102, a user can be prompted to enter a code, i.e. a password, a license key, or a pass phrase. The user-entered pass phrase can then be compared with the software module code (i.e. the code associated with the selected software module). In some embodiments, a user may not be prompted to enter a code when selecting software module 208. Specifically, a code could already be associated with computer 102 and/or industrial plant 122. This code can be based on network parameters such as an IP address or a MAC address associated with server 114 or any computer system associated with industrial plant 122.

The comparison of the user-entered code with the software module code can include decrypting at least one of the user-entered code and the software module code. Decrypting may include de-hashing, decoding, public/private key processing, and/or using any cryptographic protocols known in the art for processing encrypted data.

When the software module code for software module 208 and the user-entered code for software module 208 match, software module 208 is activated and ready for use. Once activated, software module 208 can be used indefinitely without requiring further verification when a subsequent request for its use is received.

In other embodiments, software module 208 can be used for a fixed time period, without requiring further verification. Once the fixed time period expires, software module 208 enters the inactive state, albeit remaining fully installed on server 114. In this case, the activation code received contains a time instruction for setting the fixed time period.

If the user-entered code does not match the software module code or if the activation code sent by the remote server 118 is not correctly received by the server 114, software module 208 cannot be activated, and the protocol may generate an error message alerting the user that software module 208 is unavailable for use. The above-described protocol is used for any software module of application package 200 that is requested for execution.

There could be no software module code associated with at least one software module of application package 200. For example, software module 218 may be in active state by default to allow a user of computer 304 to evaluate software module 218. A fixed time period for evaluation may be set at remote server 118 (i.e. by the vendor).

When the evaluation time period expires, an activation module code can be generated at remote server 118. The newly generated code can then be hashed, encrypted, and transmitted over network 116 to server 302, which then associates it with software module 218. As such, a subsequent request for executing software module 218 will undergo the authentication and/or verification protocol described above.

While the embodiments of FIG. 1 and FIG. 3 depict the use of servers and specific interconnections between or more computing systems and networks were described, one of skill in the art will readily appreciate that other types of connections and computing systems can be used without departing from the scope of this disclosure.

Figure 4:
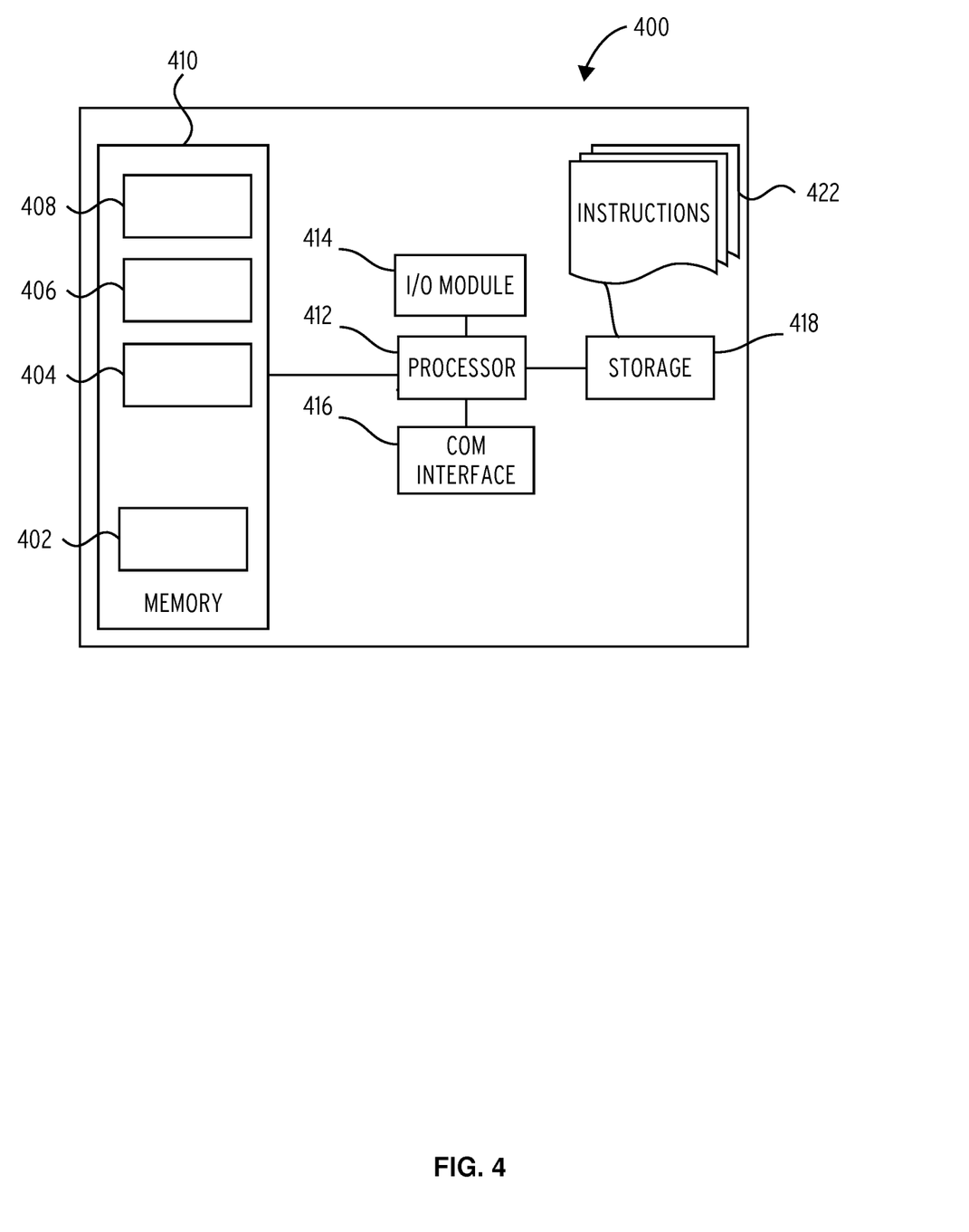
FIG. 4 is a block diagram of a device, according to an embodiment.

FIG. 4 is a block diagram illustration of a device 400 including a processor 412 that has a specific structure. The specific structure is imparted to processor 412 by instructions stored in a memory 410 included therein and/or by instructions 422 which can be fetched from a storage medium 418.

Device 400 is a stand-alone programmable device, or it may be a programmable module located in a much larger device. For example, device 400 can be part of server 114 or remote server 118 (see FIG. 1). Device 400 can include one or more hardware and/or software components configured to fetch, decode, execute, store, analyze, distribute, evaluate, and/or categorize information. Specifically, device 400 can include one or more processors like processor 412, a storage medium 418, a memory 410 or the like, and input/output hardware (I/O module 414) configured to provide an interface with one or more computing devices and/or one or more industrial machines of industrial plant 122.

Processor 412 can include one or more processing devices or cores (not shown). In some embodiments, processor 412 can be a plurality of processors, each having either one or more cores. Processor 412 can be configured to execute instructions fetched from memory 410, i.e. from one of memory block 402, memory block 404, memory block 406, or memory block 408, or the instructions may be fetched from storage medium 418, or from a remote device connected via communication interface 416.

Furthermore, storage medium 418 and/or memory 410 can include a volatile or non-volatile, magnetic, semiconductor, tape, optical, removable, non-removable, read-only, random-access, or any type of non-transitory computer-readable computer medium. Storage medium 418 and/or memory 410 can include programs and/or other information that can be used by processor 412. Furthermore, storage device 418 can be configured to log data processed, recorded, or collected during the operation of device 400. The data can be time-stamped, location-stamped, cataloged, indexed, or organized in a variety of ways consistent with data storage practice, and this without departing from the scope of the present disclosure.

For example, memory block 404 can include instructions that, when executed by processor 412, cause processor 412 to perform certain operations. The operations can include receiving a request for execution of a software module of an application package installed on a server like server 114. The request can originate from a computing device that is communicatively coupled, even remotely communicatively coupled, to processor 412 via communication interface 416. The operations can further include receiving and processing an activation code from a server like remote server 118, generated as described below, for activating the software. The operations can further include, upon receiving the request, to generate and send an activation request via network 116 to a remote server 118.

The remote server 118 can include a further device (not shown) similar in structure to device 400. The further memory block of the further device can include instructions that, when executed by a further processor, cause further processor to perform certain operations. The operations can include, upon receiving the activation request, executing an authentication and/or verification protocol. This protocol can be a routine, or a sub-routine, and it may be fetched and executed by further processor.

In one embodiment, the protocol can include checking whether a user associated with the request has a license for executing the software module. This information can be fetched by further processor from a computing device connected to it via communication interface. The operations executed by the further processor can further include, whether the authentication and/or verification protocol is positively passed, generating and forwarding an activation code to server 114. In this case, the operations executed by the processor can include to activate the software module once the activation code is received.

In another embodiment, the operations can include comparing a code associated with the user originating the request and a software module code associated with the software module that is requested for execution. The comparison of the user-associated code with the software module code can include decrypting at least one of the user-associated code and the software module code. Decrypting may include de-hashing, decoding, public/private key processing, and/or using any cryptographic protocols known in the art for processing encrypted data.

When the software module code and the user-associated code match, the software module is activated and the user is granted permission to use the requested software module. Once activated, the software module can be used indefinitely without requiring further verification when a subsequent request for its use is received by processor 412.

If the user-associated code does not match the software module code, the software module cannot be activated, and the operations may include generating an error message alerting the user that the software module is unavailable for use.

In a further embodiment, the activation code is able to directly activate the software module, without the user intervention.

In other embodiments, permission of use can be for a fixed time period, without requiring further verification. Once the fixed time period expires, the software module can enter the inactive state, albeit remaining fully installed.

In the embodiments, there may be no software module code associated with the software module. For example, a fixed time period for evaluation for the software module can be set at remote computing device connected to processor 412 via communication interface 416. The operations can include determining whether the evaluation period has expired. Upon expiry, the operations may include generating, hashing and/or encrypting a code and subsequently associating the encrypted new code with the software module.

Figure 5:
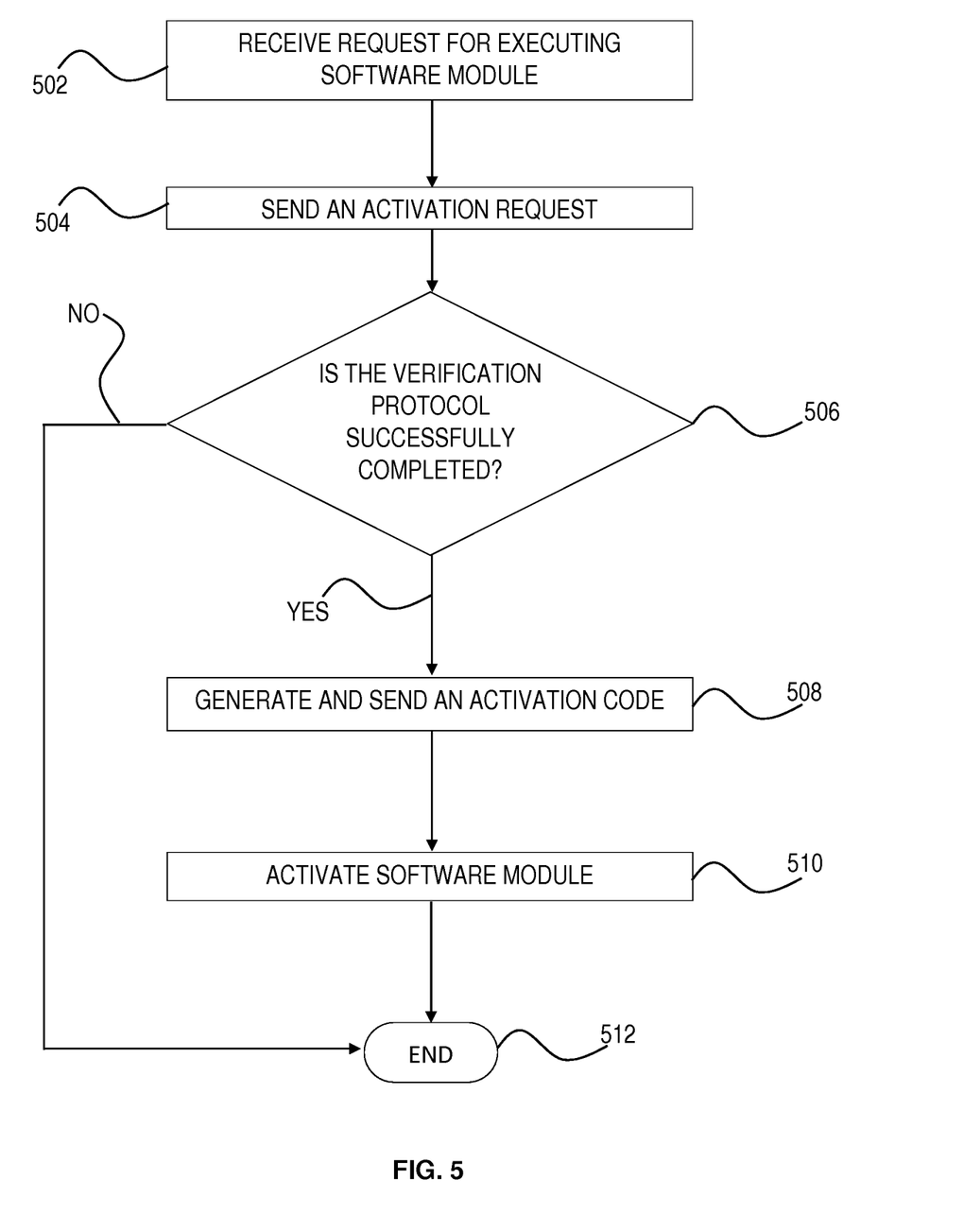
FIG. 5 depicts a flow chart of a method, in accordance with one embodiment.

Having set forth the structure of various exemplary embodiments, a method 500 consistent with the operations of these embodiments is now described in the context of FIG. 5. Part of the method 500 can be executed by a processor such as processor 412, and it can be used in the context of the embodiments shown in FIGS. 1-3, along with installed application packages like the one shown in FIG. 2.

Method 500, in block 502, includes receiving a request by a processor of a computing device. In block 504, the method 5000 includes to send an activation request to a remote server 118 via network 116. In decision block 506, method 500 performs the verification protocol. If the verification protocol is successfully completed, thus, by example, whether industrial plant 122 has a license for executing software module 208, the activation code is generated by a further processor (not shown) of the remote server 118 and forwarded to the computing device (block 508). Once the activation code is received by the processor 412, the software module is activated (block 510).

In one embodiment, this method can include determining whether at least one of the first code and the second includes an error. If the codes match, i.e. if no error is found, method 500 activates the software module at block 510, and method 500 ends at block 512. If the codes do not match, i.e. an error is found, method 500 ends at block 512 without activating the software module. The method can include executing a protocol on at least one of the first code and the second code. Further, method 500 can include generating the first code, hashing and/or encrypting the first code, and associating the first code with the software module. The authentication protocol can include at least one of encrypting, decrypting, hashing, de-hashing, coding, and decoding at least one of the first code and the second code.

Furthermore, the protocol can include decrypting at least one of the first code and the second code. Method 500 can further include setting an expiration time following the activation of the software module. Method 500 can further include executing, following activation, the software module to control one or more industrial machines. In some embodiments, the second code can be associated with network parameters of the device originating the request. Method 500 can further include logging the first code, the second code, and data associated with the device originating the request in a database.

Those skilled in the relevant art(s) will appreciate that various adaptations and modifications of the embodiments described above can be configured without departing from the scope and spirit of the disclosure. Therefore, it is to be understood that, within the scope of the appended claims, the disclosure may be practiced other than as specifically described herein.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for enabling a software module included in a plurality of software modules of an application package installed on a computer system configured to control a turbomachine, the method comprising:
   receiving, via a processor of the computer system, a request for executing the software module;
   via the processor of the computer system, generating a first code, encrypting the first code, and associating the first code with the software module;
   via the processor of the computer system determining whether the first code matches with a second code associated with the software module, the determining including executing a verification protocol on at least one of the first code and the second code, the verification protocol including calculating a check value for at least one of the first code and the second code;
   via the processor of the computer system, activating the software module automatically and without human intervention when the verification protocol indicates that the first code includes no error; and
   tuning at least one function of a turbomachine train with the activated software to alter an aspect of turbomachine performance, said tuning comprising tuning a combustion mapping to control emissions of the turbomachine train.

2. The method of claim 1, wherein the tuning step further comprises tuning: (i) efficiency of the turbomachine train, (ii) power of the turbomachine train, or (iii) efficiency and power of the turbomachine train.

3. The method of claim 1, further comprising setting an expiration time following activating the software module.

4. The method of claim 1, wherein the check value is calculated by a remote server on a network in communication with the computer system, and a local server on the network in communication with the remote server determines whether the first code matches with the second code associated with the software module.

5. The method of claim 1, wherein the verification protocol includes encrypting the second code.

6. The method of claim 5, wherein the second code is associated with network parameters of the device originating the request.

7. The method of claim 6, further comprising logging the first code, the second code, and data associated with the device originating the request in a database.

8. A system for enabling a software module included in a plurality of software modules of an application package installed on a computer system configured to control a turbomachine, the computer system comprising a processor and a memory storing instructions that, when executed by the processor, cause the computer system to perform operations comprising:
   receiving a request for executing the software module;
   generating a first code, encrypting the first code, and associating the first code with the software module;
   determining whether the first code matches with a second code associated with the software module, the determining including executing a verification protocol on at least one of the first code and the second code, the verification protocol including calculating a check value for at least one of the first code and the second code;
   activating the software module automatically and without human intervention when the verification protocol indicates that the first code includes no error; and
   tuning at least one function of a turbomachine train with the activated software to alter turbomachine performance, said tuning comprising tuning a combustion mapping to control emissions of the turbomachine train.

9. The system of claim 8, wherein the tuning step further comprises tuning: (i) efficiency of the turbomachine train, (ii) power of the turbomachine train, or (iii) efficiency and power of the turbomachine train.

10. The system of claim 8, wherein the check value is calculated by a remote server on a network in communication with the computer system, and a local server on the network in communication with the remote server determines whether the first code matches with the second code associated with the software module.

11. The system of claim 8, wherein the verification protocol further includes encrypting the second code.

12. The system of claim 11 wherein the second code is associated with network parameters of the device originating the request.

13. The system of claim 12, wherein the instructions further configure the computer system to log the first code, the second code, and data associated with the device originating the request in a database.

14. A non-transitory computer-readable storage medium of a computer system configured to control a turbomachine, the non-transitory computer readable storage medium including instructions that when executed by a processor of the computer system cause the computer system to perform operations comprising:
receiving a request for executing a software module included a plurality of software modules of an application package installed on the computing device;
generating a first code, encrypting the first code, and associating the first code with the software module;
determining whether the first code matches with a second code associated with the software module, the determining including executing a verification protocol on at least one of the first code and the second code, the verification protocol including calculating a check value for at least one of the first code and the second code;
activating the software module automatically and without human intervention when the verification protocol indicates that the first code includes no error; and
tuning at least one function of a turbomachine train with the activated software to alter turbomachine performance, said tuning comprising tuning a combustion mapping to control emissions of the turbomachine train.

15. The computer-readable storage medium of claim 14, wherein the tuning step further comprises tuning: (i) efficiency of the turbomachine train, (ii) power of the turbomachine train, or (iii) efficiency and power of the turbomachine train.

16. The computer-readable storage medium of claim 14, wherein the verification protocol further includes encrypting the second code.

17. The computer-readable storage medium of claim 14, wherein the check value is calculated by a remote server on a network in communication with the computer system, and a local server on the network in communication with the remote server determines whether the first code matches with the second code associated with the software module.

* * * * *